United States Patent [19]
Tanabe

[11] Patent Number: 5,997,430
[45] Date of Patent: Dec. 7, 1999

[54] SPEED CHANGE CONTROLLER FOR A CONTINUOUSLY VARIABLE TRANSMISSION

[75] Inventor: Souichirou Tanabe, Atsugi, Japan

[73] Assignee: Nissan Motor Co., Ltd., Yokohama, Japan

[21] Appl. No.: 09/102,036

[22] Filed: Jun. 22, 1998

[30] Foreign Application Priority Data

Jun. 24, 1997 [JP] Japan ................................. 9-167394

[51] Int. Cl.⁶ .................................................. F16H 11/00
[52] U.S. Cl. ............................................................. 477/46
[58] Field of Search ....................................... 477/46, 48

[56] References Cited

U.S. PATENT DOCUMENTS 5,609,544  3/1997  Lardy et al. ........................... 477/46
5,871,416  2/1999  Sawada et al. ......................... 477/47
5,871,417  2/1999  Suauki .................................. 477/43

FOREIGN PATENT DOCUMENTS

60-256664  12/1985  Japan .

Primary Examiner—Dirk Wright
Attorney, Agent, or Firm—Foley & Lardner

[57] ABSTRACT

A manual operation mode specifying a fixed speed change ratio by manual operation is set in a continuously variable transmission for a vehicle which continuously varies a speed change ratio to an arbitrary target speed change ratio. The manual operation mode defines for example first speed-fourth speed. While a driver is accelerating at the specified speed change ratio, the speed change ratio is decreased when a predetermined vehicle speed is reached. A difference of speed change ratio when the driver performs a shift-up operation after this decrease is thereby reduced. As a result, there are fewer drops of engine rotation speed due to shift-up, and acceleration performance is improved.

9 Claims, 7 Drawing Sheets

FIG. 7

SPEED CHANGE CONTROLLER FOR A CONTINUOUSLY VARIABLE TRANSMISSION

FIELD OF THE INVENTION

This invention relates to control of a continuously variable transmission, and in particular to selective application of a manual operation mode and an automatic operation mode to the transmission.

BACKGROUND OF THE INVENTION

An automatic transmission comprising a gear type speed change mechanism having an automatic operation mode for automatically changing over a speed change ratio according to a throttle opening and a vehicle speed, and a manual operation mode wherein the speed change ratio is manually set by an operator, is disclosed for example in Tokkai Sho 60-256664 published by the Japanese Patent Office in 1985.

This transmission is provided with a mode change-over switch which changes over between an automatic operation mode and a manual operation mode, and an up switch and down switch used in the manual operation mode.

The operation of these switches is performed by a shift lever. In the manual operation mode, when the up switch is ON shift up is performed, and when the down switch is ON, shift down is performed.

However, when this manual operation mode is applied to a belt type continuously variable transmission, for example such as is indicated in Tokkai Hei 8-178055 published the Japanese Patent Office in 1996, or to a toroidal continuously variable transmission, the following problem occurs.

It is a characteristic of a continuously variable transmission wherein the speed change ratio is varied continuously, that compared to a conventional automatic transmission which varies the speed change ratio in a stepwise manner, a change of engine load due to a change of speed change ratio is smooth, and energy loss is small. However, when the manual operation mode is applied to a continuously variable transmission, and plural speed change ratios simulating a manual transmission are applied selectively, the engine output may temporarily fall considerably due for example to a shift-up operation.

Therefore in the manual operation mode, torque performance is less than for a continuous speed change operation in the automatic operation mode.

To resolve this problem, the number of speed change steps may be increased, but the frequency of speed change operations increases as a result.

SUMMARY OF THE INVENTION

It is therefore an object of this invention to apply a manual speed change mode to a continuously variable transmission while ensuring torque performance and ease of speed change operation.

In order to achieve the above object, this invention provides a speed change controller for controlling a speed change ratio of such a continuously variable transmission for a vehicle that transmits an engine rotation speed at an arbitrary speed change ratio. The controller comprises a selector switch allowing a driver of the vehicle to specify a target speed change ratio from among plural candidate speed change ratios, a sensor for detecting a vehicle speed, and a microprocessor programmed to control the speed change ratio of the continuously variable transmission to the target speed change ratio and decrease the target speed change ratio within a predetermined range when a vehicle speed is equal to or greater than a predetermined value.

It is preferable that the controller further comprises a sensor for detecting a running state of the vehicle, and the microprocessor is further programmed to set the target speed change ratio based on the vehicle running state when the target speed change ratio is not specified by the selector switch.

It is also preferable that the controller further comprises a sensor for detecting an engine load, and the microprocessor is further programmed to set the predetermined value to a larger value the larger the engine load.

It is also preferable that the microprocessor is further programmed to set said predetermined range larger the larger the engine load.

It is also preferable that the microprocessor is further programmed to prevent a decrease of the target speed change ratio when the engine load is less than a predetermined load.

It is also preferable that the microprocessor is further programmed to set said predetermined range for the same load to be larger the greater the target speed change ratio.

It is also preferable that the microprocessor is further programmed to prevent a decrease of the target speed change ratio when the target speed change ratio specified by the selector switch is different from a predetermined speed change ratio.

It is also preferable that the microprocessor is further programmed to determine said predetermined range so that the minimum speed change ratio within said range is situated between the speed change ratio specified by the selector switch and one of the candidate speed change ratios having a nearest value to the speed change ratio specified by said selector switch, while said minimum speed change ratio is larger than the target speed change ratio.

It is also preferable that the selector switch is further functioning to select a decrease characteristic to the decreasing of the target speed change ratio from among plural candidate characteristics, and the microprocessor is further programmed to decrease the target speed change ratio according to the decrease characteristic.

In this case, it is further preferable that the plural candidate characteristics comprise a characteristic for prohibiting decrease of the target speed change ratio.

The details as well as other features and advantages of this invention are set forth in the remainder of the specification and are shown in the accompanying drawings.

DESCRIPTION OF THE PREFERRED EMBODIMENTS

Figure 1:
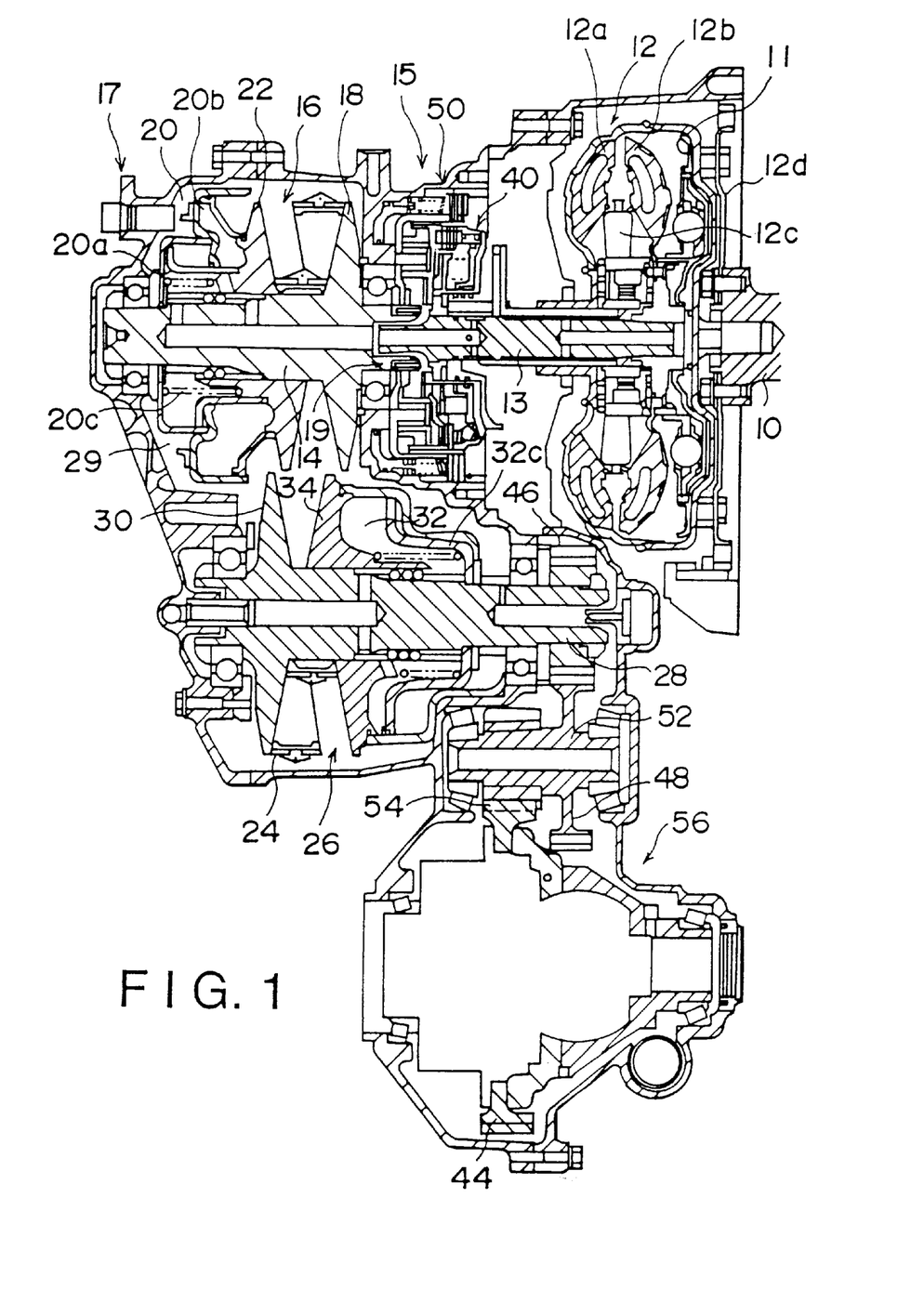
FIG. 1 is a longitudinal sectional view of a continuously variable transmission to which this invention is applied.

Referring to FIG. 1 of the drawings, a torque converter 12 is connected to an engine output shaft 10.

The torque converter 12 comprises a lockup clutch 11. The lockup clutch 11 mechanically connects or disconnects an impeller 12a which is an input part and a turbine 12b which is an output part according to the oil pressure supplied to a converter chamber 12c and a lockup oil chamber 12d.

The turbine 12b is connected to a rotation shaft 13, the rotation shaft 13 being connected to a forward/reverse change-over mechanism 15. The mechanism 15 comprises a planetary gear mechanism 19, forward clutch 40 and reverse brake 50. The output shaft of the mechanism 19 is connected to a drive shaft 14 formed coaxially with the rotation shaft 13. The drive shaft 14 comprises the input shaft of a continuously variable transmission (CVT) 17. It should be noted that a fluid coupling or an electromagnetic clutch may be used instead of the torque converter 12.

The CVT 17 comprises a drive pulley 16 and driven pulley 26, and a V-belt 24 which transmits the rotation of the drive pulley 16 to the driven pulley 26, as described hereinabove.

The drive pulley 16 comprises a fixed conical plate 18 which rotates together with the drive shaft 14 and a movable conical plate 22 disposed relative to the fixed conical plate 18 forming a V-shaped pulley groove with the fixed conical plate 18. The movable conical plate 22 moves in the axial direction of the drive shaft 14 according to an oil pressure acting on a drive pulley cylinder chamber 20 while it rotates with the fixed conical plate 18. The drive pulley cylinder chamber 20 comprises a chamber 20a and chamber 20b. The movable conical plate 22 has a pressure receiving surface larger that of a movable conical plate 34 described hereinafter.

The driven pulley 26 is installed on a driven shaft 28. The driven pulley 26 comprises a fixed conical plate 30 which rotates together with the driven shaft 28 and a movable conical plate 34 disposed relative to the fixed conical plate 30 forming a V-shaped pulley groove with the fixed conical plate 30. The movable conical plate 34 moves in the axial direction of the driven shaft 28 according to an oil pressure acting on a driven pulley cylinder chamber 32 while it rotates with the fixed conical plated 30.

The driven pulley 28 is provided with a drive gear 46 which rotates together with the pulley 28. The drive gear 46 engages with an idler gear 48 on an idler shaft 52. The idler shaft 52 comprises a pinion gear 54 which rotates together with the shaft 52. The pinion gear 54 engages with a final gear 44. The final gear 44 drives a propeller shaft or drive shaft, not shown, via a differential unit 56.

The rotation input to the CVT 17 from the engine output shaft 10 is transmitted to the forward/reverse change-over mechanism 15 via the torque converter 12 and rotation shaft 13. When the forward clutch 40 is engaged and the reverse brake 50 is released, the rotation of the rotation shaft 13 is transmitted to the drive shaft 14 of the CVT 17 with the same rotation direction via the planetary gear mechanism 19 whereof the input shaft and output shaft rotate together. On the other hand, when the forward clutch 40 is released and the reverse brake 50 is engaged, the rotation of the rotation shaft 13 is transmitted to the drive shaft 14 with the opposite rotation direction due to the action of the planetary gear mechanism 19.

The rotation of the drive shaft 14 is transmitted to the differential unit 56 drive pulley 16, V-belt 24, driven pulley 26, driven shaft 28, drive gear 46, idler gear 48, idler shaft 52, pinion gear 54 and final gear 44. When the forward clutch 40 and reverse brake 50 are both released, the forward/reverse change-over mechanism 15 goes into neutral, and transmission of a rotation from the rotation shaft 13 to the drive shaft 14 does not occur.

In the aforesaid dynamic transmission, the rotation ratio, i.e. speed change ratio (deceleration ratio) between the drive pulley 16 and driven pulley 26 varies when the movable conical plate 22 of the drive pulley 16 and movable conical plate 34 of the driven pulley 26 are moved in axial direction so as to alter the contact point radius with the V-belt 24. For example, if the width of the V-shaped pulley groove of the drive pulley 16 is enlarged and the width of the V-shaped pulley groove of the driven pulley 26 is narrowed, the contact point radius of the V-belt 24 on the side of the drive pulley 16 decreases and the contact point radius of the V-belt 24 on the side of the driven pulley 24 increases, so a large deceleration ratio is obtained. When the movable conical plates 22, 34 are moved in the opposite direction, the deceleration ratio becomes smaller.

This control of the widths of the V-shaped pulley grooves of the drive pulley 16 and driven pulley 26 is performed by controlling the relative pressures of the drive pulley cylinder chamber 20 (20a, 20b) and driven pulley cylinder chamber 32 via a control system described hereinafter.

Figure 2:
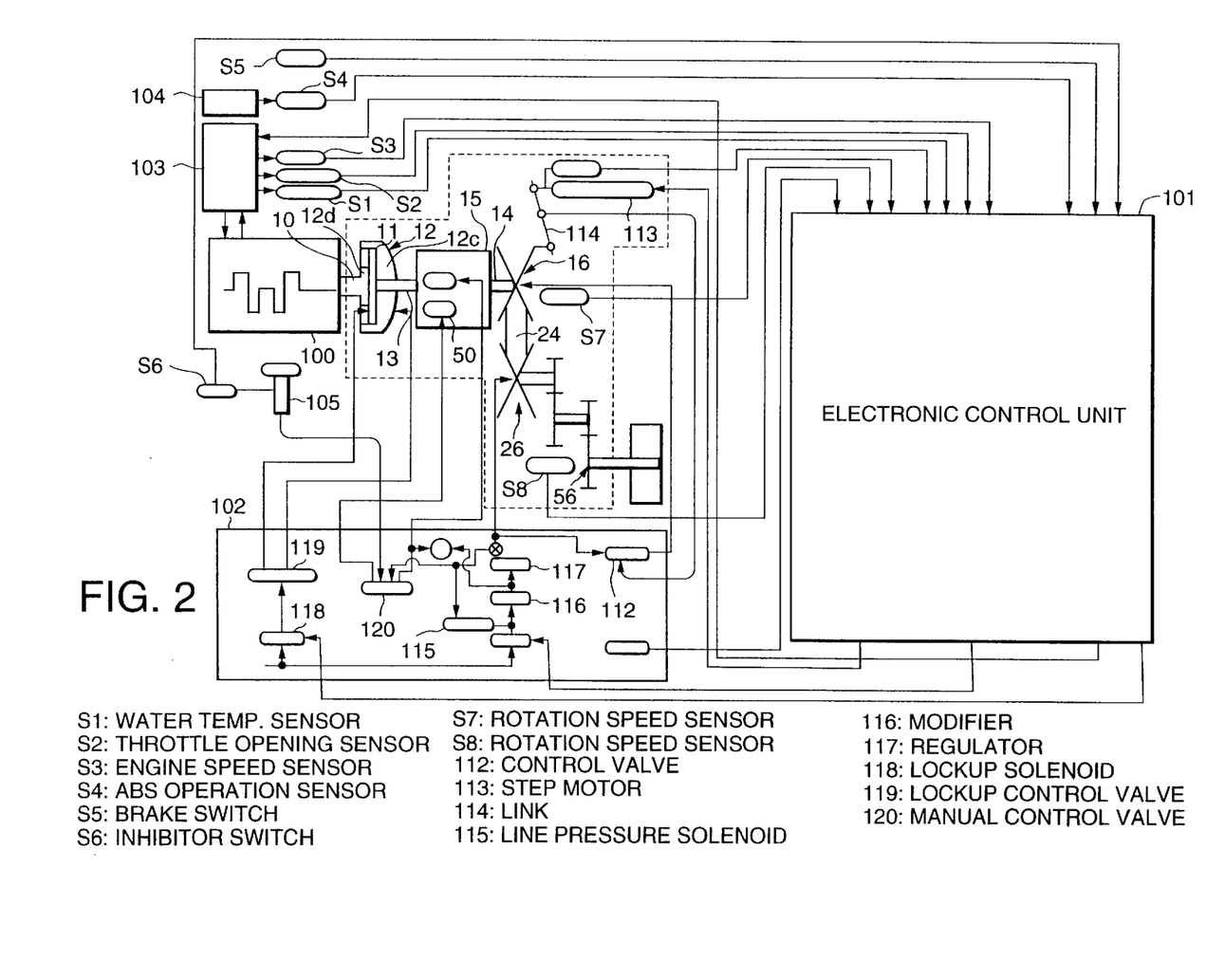
FIG. 2 is a schematic diagram of a speed change controller according to this invention.

The rotation ratio of the CVT 17 is controlled by an electronic control unit 101 and a hydraulic control unit 102 shown in FIG. 2. In this figure, the same symbols are used as for the mechanism in FIG. 1.

The electronic control unit 101 comprises a microcomputer comprising a central processing unit (CPU), read-only memory (ROM), random-access memory (RAM), and input/output interface.

Signals from a water temperature sensor S1, throttle opening sensor S2, engine rotation sensor S3, ABS operation sensor S4 from an antilock brake system (ABS) controller 104, brake switch S5 which emits a signal when the vehicle is braked, inhibitor switch S6 for detecting an operation position of a selector lever 105, rotation speed sensor S7 for detecting a rotation speed of the drive pulley 16 and a rotation speed sensor S8 for detecting a rotation speed of the driven pulley 26, are input into the electronic control unit 101.

The electronic control unit 101 controls a speed change ratio of the CVT17, line pressure and lock up clutch 11 using various signals.

An oil pressure control unit 102 is provided with a control valve 112, line pressure solenoid 115, modifier (pressure control valve) 116, regulator (constant-pressure valve) 117, lock up solenoid 118, lock up control-valve 119 and manual control valve 120.

Describing these control functions in detail, the electronic control unit 101 outputs a control signal to the step motor 113 so as to perform a speed change according to a preset pattern set according to for example an engine load represented by throttle opening, rotation speed and vehicle speed. The throttle opening is detected by the throttle opening sensor S2, the engine rotation speed is detected by the engine rotation speed sensor S3, and a vehicle speed is detected by the rotation sensor S8 which detects the rotation speed of the driven pulley 26.

The step motor 113 drives a control valve 112 so as to obtain a speed change ratio corresponding to the control signal, a line pressure supplied to a drive pulley cylinder chamber 20 shown in FIG. 1 is controlled, and the pressures of the drive pulley cylinder chamber 20 and a driven pulley cylinder chamber 32 are varied relative to each other.

A displacement position of the drive pulley 16, i.e. the speed change ratio, is fed back via a link 114 to the control valve 112. Due to this feedback control, after having realized a target speed change ratio corresponding to the position of the step motor 113, the electronic control unit 101 fixes the relative pressures of the pulley cylinder chambers 20 and 32, and the speed change ratio is maintained at the target speed change ratio.

In this speed change ratio control of the CVT17, when the line pressure acting on the pulleys 16 and 26 is too small, the frictional force between the pulleys 16,18 and the V belt 24 is insufficient, and the V belt 24 slips. Conversely when the line pressure is excessive, the frictional force is unnecessarily large. In both cases, there is an adverse effect on the fuel consumption and torque performance of the vehicle. The line pressure control unit 107 therefore controls line pressure so as to obtain an appropriate toque transmission which is neither excessive nor deficient according to the running state of the vehicle.

After the line pressure solenoid 115 adjusts the oil pressure supplied from an oil pump, not shown, to a suitable target line pressure via the modifier 116 and regulator 117, this pressure is supplied to the driven pulley cylinder chamber 32.

It is also supplied to the drive pulley cylinder chamber 20 via the control valve 112.

The electronic control unit 101 performs control so as to engage the lock-up clutch 11 when the vehicle speed is higher than a predetermined value and release it when the vehicle speed is less than the predetermined value.

For this purpose, the electronic control unit 101 drives the lock up solenoid 118 of the oil pressure control unit 102 according to the vehicle speed, and changes over the lock up control-valve 119. The lock up control-valve 119 changes over between a system which supplies the oil pressure of the oil pump to a converter chamber 12c of the torque-converter 12 as an applied pressure of the lock-up clutch 11 and releases the lock-up oil chamber 12d, and a system which supplies the oil pressure of the oil pressure pump to the lock-up oil chamber 12d as a release pressure and releases the converter chamber 12c.

The manual valve 120 operates together with a selector lever 105, and selectively supplies oil pressure supplied from the oil pump via the line pressure solenoid 115 to the forward clutch 40 and a reverse brake 50 of the forward/reverse change-over mechanism 15 according to the operating position of the selector lever 105.

In this way, the forward /reverse change-over mechanism 15 is changed over between the forward, reverse and neutral positions.

The basic structure of the aforesaid CVT and its controller is disclosed in the above-mentioned Tokkai Hei 8-178055.

In the speed change controller according to this invention, a manual operation position commanding a speed change in the manual operation mode is set by the selector lever 105, and a position corresponding to four speed regions 1–4 of this manual operating position is also set.

These positions are detected by an impedance switch S6.

Next, referring to FIG. 3, the control performed when the CVT 17 is operated in the manual operation mode will be described.

The basic speed change ratio of each of these four speed regions are shown by straight lines which corresponds to the left-hand end of each speed region.

However, the speed change ratio of each speed region is not fixed, and it varies to a smaller value when a specific vehicle speed is reached as the vehicle accelerates at the basic speed change ratio. It should be noted that, in the following description, the smaller the speed change ratio the higher the vehicle speed.

This specific vehicle speed is determined by the throttle opening TVO, and is higher the larger the throttle opening TVO.

Figure 3:
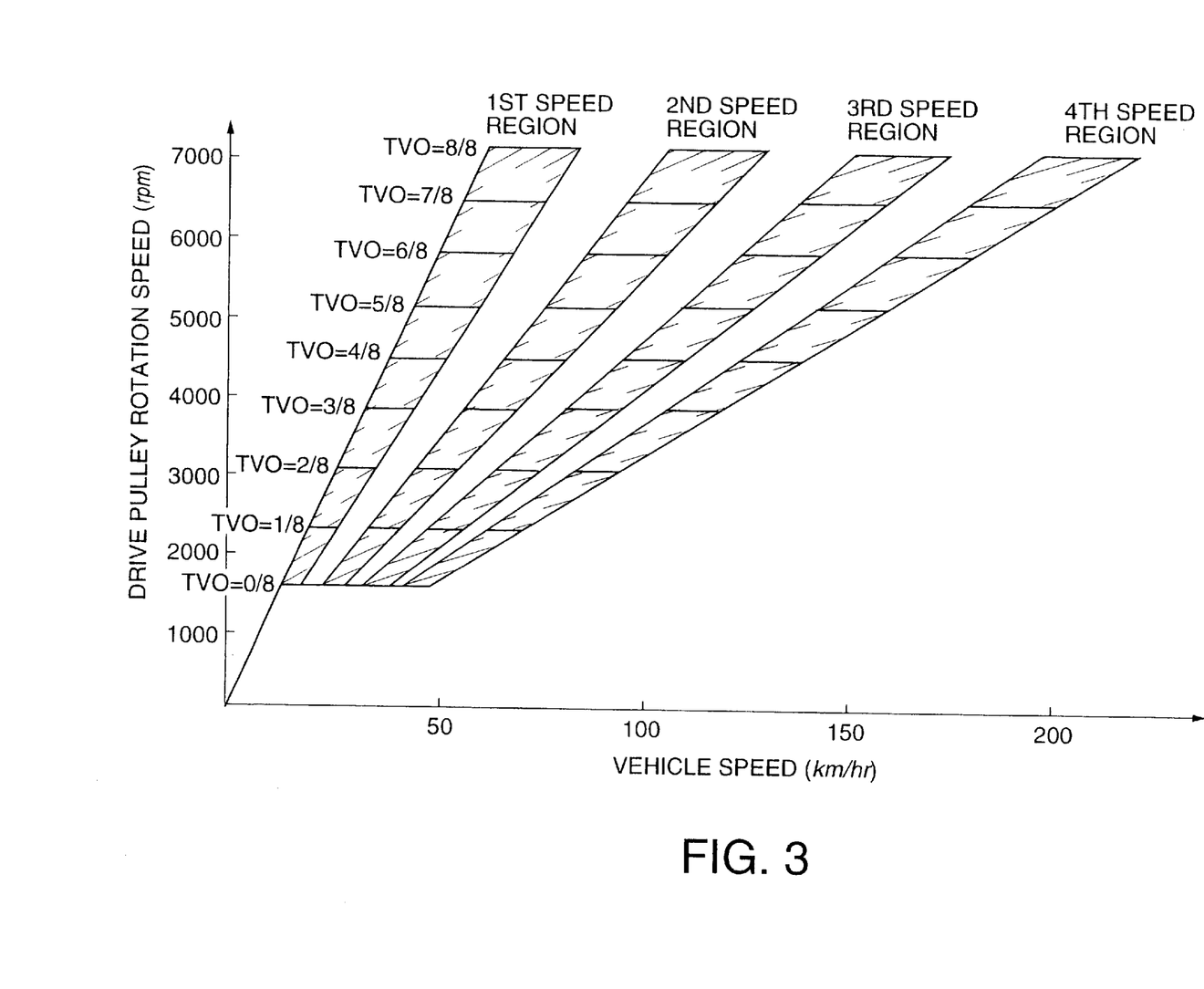
FIG. 3 is a diagram showing a speed change characteristic in a manual operation mode according to the speed change controller.

For example, when TVO=4/8 at the first speed region in FIG. 3, the speed change ratio becomes smaller, i.e., it varies in the vehicle speed increasing direction at a higher drive pulley rotation speed than when TVO=3/8.

In the figure, the throttle opening TVO is shown in units of n/8 (n=0–8), but the speed change ratio varies continuously even at an intermediate opening.

The speed change ratio variation width Is set such that the maximum ratio reaches approximately an intermediate value between the basic speed change ratio and the basic speed change ratio for the adjacent speed region.

As there is no adjacent speed region for the fourth speed which is the highest gear, the variation width is determined taking account of the high speed performance or fuel consumption performance required of the vehicle, or of extra engine output.

Figure 4:
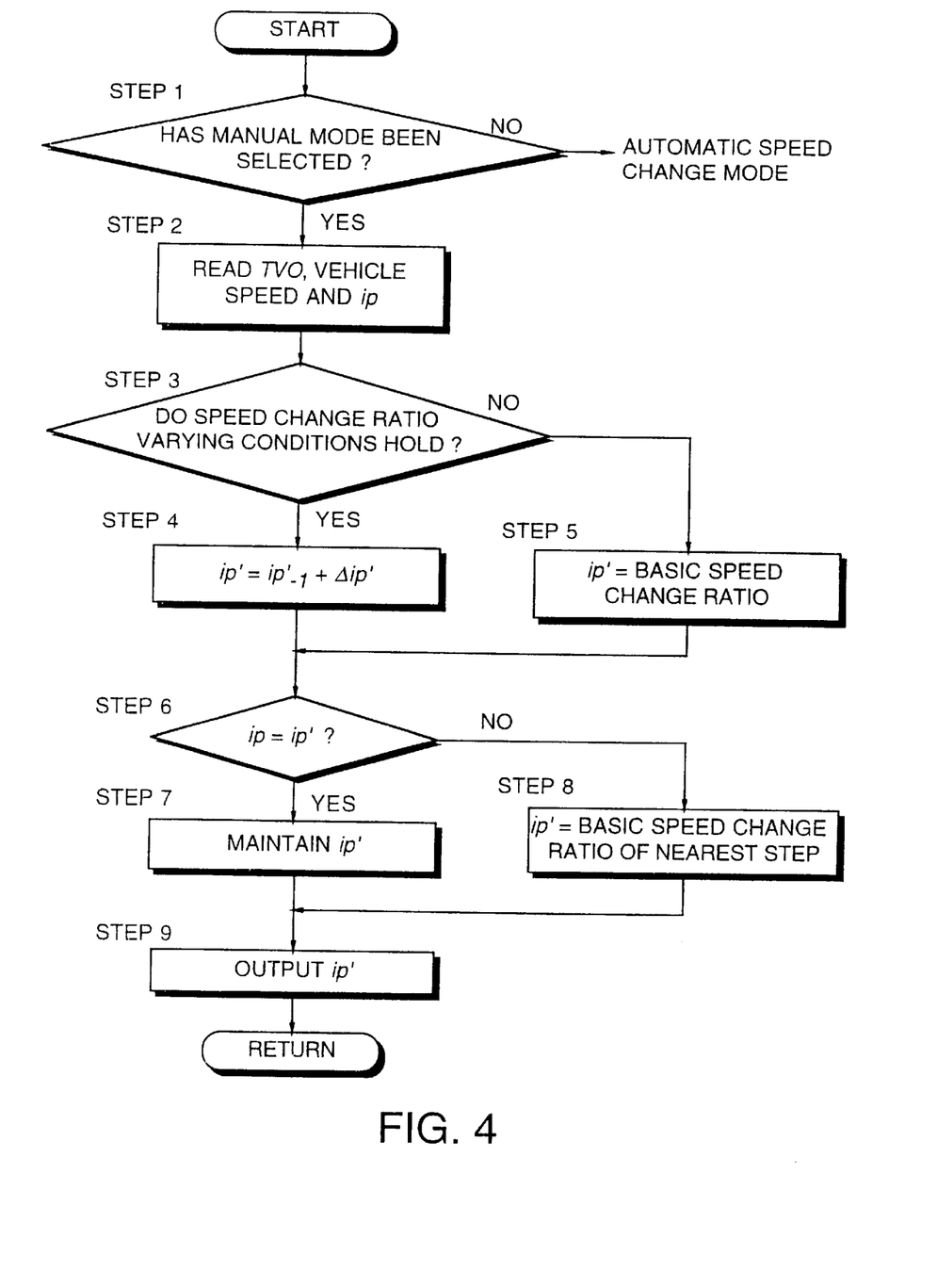
FIG. 4 is a flowchart for describing a speed change control process in the manual operation mode performed by the speed change controller.

Next, referring to FIG. 4, the speed change control process performed by this controller to realize the aforementioned speed change characteristics in the manual operation mode will be described. This process is executed at a fixed interval.

In this control, first in a STEP 1, it is determined whether the driver has selected the manual operation mode or the automatic operation mode based on the position of the selector lever 105 detected by the inhibitor switch S6.

The manual operation mode is a speed change mode wherein speed change ratio is based on a speed region selected by the driver, and the automatic operation mode is a speed change mode wherein the speed change ratio continuously varies automatically according to vehicle speed and engine load.

When the manual operation mode is not selected in the STEP 1, speed change control for the automatic operation mode is performed. In this case, the speed change ratio is determined automatically from startup of the vehicle to when maximum vehicle speed is reached. This control algorithm is known for example from the above-mentioned Tokkai Hei 8-178055.

When the manual operation mode is selected in the STEP 1, the position of the selector lever 105 (i.e., first speed-fourth speed) is read in the STEP 2.

The throttle opening TVO which represents the engine load, the vehicle speed and a present pulley ratio ip are read. The pulley ratio ip is the ratio of the rotation speeds of the drive pulley 16 and driven pulley 26, and is equal to the speed change ratio of the CVT 17. The pulley ratio ip is found from signals from the rotation speed sensors S7, S8.

Next, the process proceeds to a STEP 3, and it is determined whether or not a speed change ratio varying condition holds. The speed change ratio varying condition is a condition which makes a target speed change ratio ip' vary towards higher speed from a basic speed change ratio shown in FIG. 3. A map corresponding to the diagram of FIG. 3 is pre-stored in the electronic control unit 101 to perform this determination. The electronic control unit 101 determines that the speed change ratio varying condition is satisfied when a real vehicle speed reaches a vehicle speed specified by the throttle opening TVO at the basic speed change ratio.

When the speed change ratio varying condition holds, the target speed change ratio ip' is calculated in a STEP 4. In this case, the target speed change ratio ip' increases with a constant change rate Δip'. If the speed change ratio on the immediately preceding occasion is ip'$_{-1}$, the target speed change ratio ip' is calculated by the following equation.

$$ip' = ip'_{-1} + \Delta ip'$$

On the other hand, when the speed change ratio varying condition does not hold in the STEP 3, the target speed change ratio ip' is determined according to the basic speed change ratio in a STEP 5.

It should be noted that, in this process, when the real vehicle speed reaches the vehicle speed specified by the throttle opening TVO and basic speed change ratio, the target speed change ratio varies automatically.

However, it is also possible that the driver determines whether the target speed change ratio should be made fixed or variable as described hereabove for the same speed region, or that the electronic control unit 101 determines it, but according to an engine running condition such as the engine load, instead of the vehicle speed.

The change-over of the target speed change ratio may easily be performed by storing plural maps giving different target speed change ratios ip' relative to the throttle opening TVO and vehicle speed in the electronic control unit 101, and selectively applying these maps.

These plural maps may further involve maps for which the target speed change ratio variation amount is different at the same throttle opening, and maps wherein the variation of the target speed change ratio is prohibited at a predetermined vehicle speed.

In this way, when the target speed change ratio ip' is determined, the target speed change ratio ip' is compared with the real speed change ratio ip in a STEP 6.

When ip=ip', the real speed change ratio is equal to the target value, so the target speed change ratio ip' is set to the value found in the STEP 4 or STEP 5 so as to maintain this target speed change ratio in a STEP 7.

The condition ip≠ip' occurs for example immediately after a shift from the automatic operation mode to the manual operation mode, or immediately after a shift up or shift down operation in the manual operation mode.

In this case, the basic speed change ratio of the region nearest to the real pulley ratio ip is set as the target speed change ratio ip' in a STEP 8.

In a STEP 9, a control signal corresponding to the set target speed change ratio ip' is output to the step motor 113.

Next, the control due to the above-mentioned control process will be described referring to FIG. 5.

Herein, as an example, the change of the target speed change ratio and vehicle speed is shown when there is a shift-up to second speed from first speed at a throttle opening TVO=4/8 in manual operation mode, and the same throttle opening is then maintained.

When the vehicle starts to accelerate, the target speed change ratio is equal to the basic speed change ratio for first speed.

During this acceleration, when the vehicle speed reaches about 45 km/hr at TVO=4/8, the target speed change ratio begins to vary to high speed from a point A. As a result, vehicle speed increases while the rotation speed of the drive pulley remains effectively constant.

The target speed change ratio reaches a point B corresponding to the upper limit of the target speed change ratio variation width, and when the accelerator pedal is further depressed in first speed so as to continue the acceleration, the drive pulley rotation speed and vehicle speed increase while the target speed change ratio which has reached the point B is maintained.

When the accelerator pedal is held in the depression amount corresponding to the throttle opening TVO=4/8, and a shift-up operation to second speed is performed at or in the vicinity of the point B, the rotation speed of the drive pulley drops temporarily because of the shifting of the speed change ratio to the basic speed change ratio for second speed.

After the drive pulley rotation speed has dropped to a point C, the drive pulley rotation speed and vehicle speed increase at the basic speed change ratio for second speed.

In this way, when the vehicle speed reaches about 95 km/hr at TVO=4/8, the speed change ratio begins to vary towards high speed from a point D.

In this case also, the vehicle speed increases to a point E while the drive pulley rotation speed remains effectively constant in the same way as the aforesaid interval A–B.

After reaching to the point E, the vehicle speed increases to a point F as the throttle opening TVO increases while the target speed change ratio for the point E is maintained.

The point F corresponds to a vehicle speed determined according to the extra engine output or an engine rotation limit.

If the driver performed a shift-up to second speed at the point A at the basic speed change ratio for first speed, the rotation speed of the drive pulley would drop to a point C' while the vehicle speed Is maintained. This drop of rotation speed is about 2500 rpm. This corresponds to a shift operation from first speed to second speed when the target speed change ratio is fixed at the basic speed change ratio in manual operation mode.

According to this invention, by performing shift-up at the point B, the drop of drive pulley rotation speed occurring due to the shift up operation is suppressed to 1500 rpm.

Therefore, if the driver performs a shift-up at or in the vicinity of the point B, this speed change controller gives a far superior acceleration performance to that of a speed change controller wherein the speed change ratio in the manual operation mode is fixed at the basic speed change ratio.

In a device wherein the target speed change ratio is fixed at the basic speed change ratio, to accelerate to a vehicle speed corresponding to the point B, the accelerator pedal must be depressed almost to the limit and the throttle opened to maximum opening.

In this case, if a shift-up operation is performed at the vehicle speed corresponding to point B, there is a very large decrease of drive pulley rotation speed due to shift-up.

Further, according to this speed change controller, the vehicle speed at which the target speed change ratio varies is set to be higher the larger the throttle opening TVO, as described hereabove. Therefore, the acceleration time under the basic speed change ratio becomes longer for high loads which corresponds to a greater acceleration demand, and as a result, the acceleration performance actually obtained matches the demand.

Figure 5:
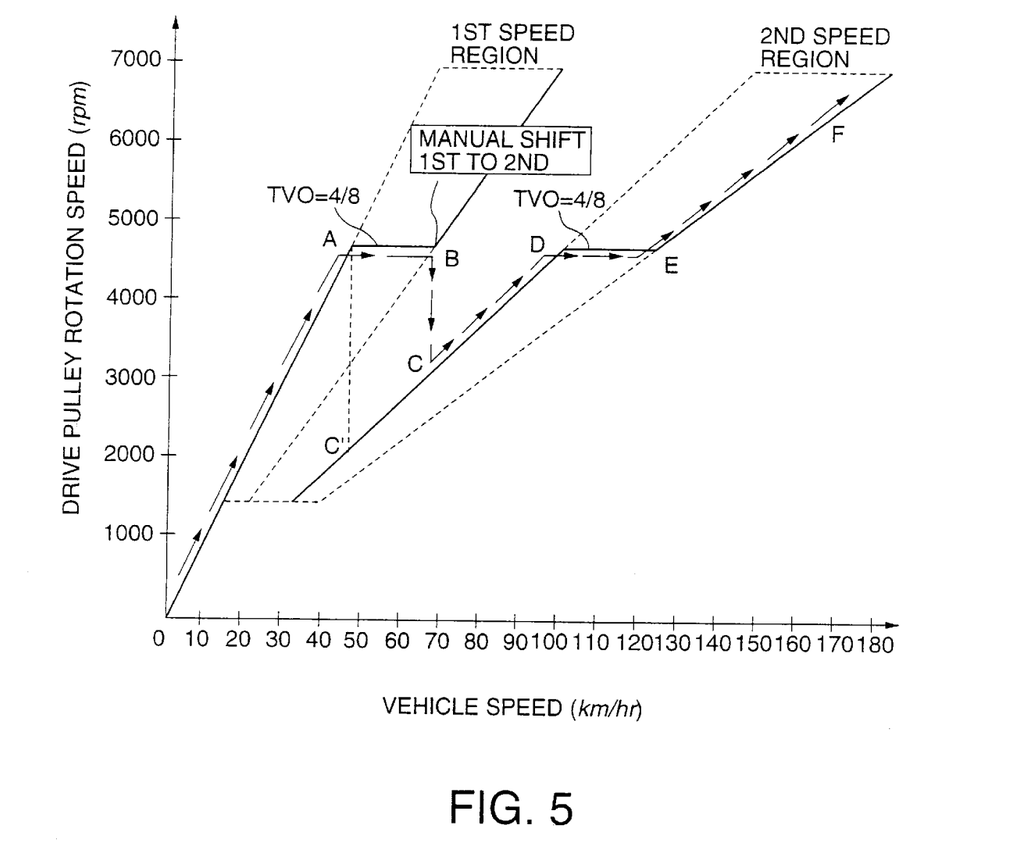
FIG. 5 is a diagram describing a speed change operation by the speed change controller.

In this embodiment, as shown in FIG. 3 or FIG. 5, the smallest target speed change ratio in each speed region is set to be larger than the basic speed change ratio for the adjacent speed region, i.e. it is set to give lower speed, and the drive pulley rotation speed therefore drops due to a shift up operation. This drop causes the driver to experience a response feeling specific to the manual operation of the transmission.

However, the smallest target speed change ratio may be set such that the smallest ratio overlaps with the basic speed change ratio of the adjacent speed region. In this case, although the drop of drive pulley rotation speed due to shift-up is zero and the aforesaid response feeling disappears, the highest acceleration performance can be obtained.

Also, the speed change ratio variation width for each speed region at the same throttle opening may be set to be largest for first speed and smallest for fourth speed, i.e. so that it increases the lower the speed region.

In this case, the acceleration performance for the speed region immediately after vehicle startup is higher than for other speed regions, and acceleration performance during vehicle startup is improved.

Figure 6:
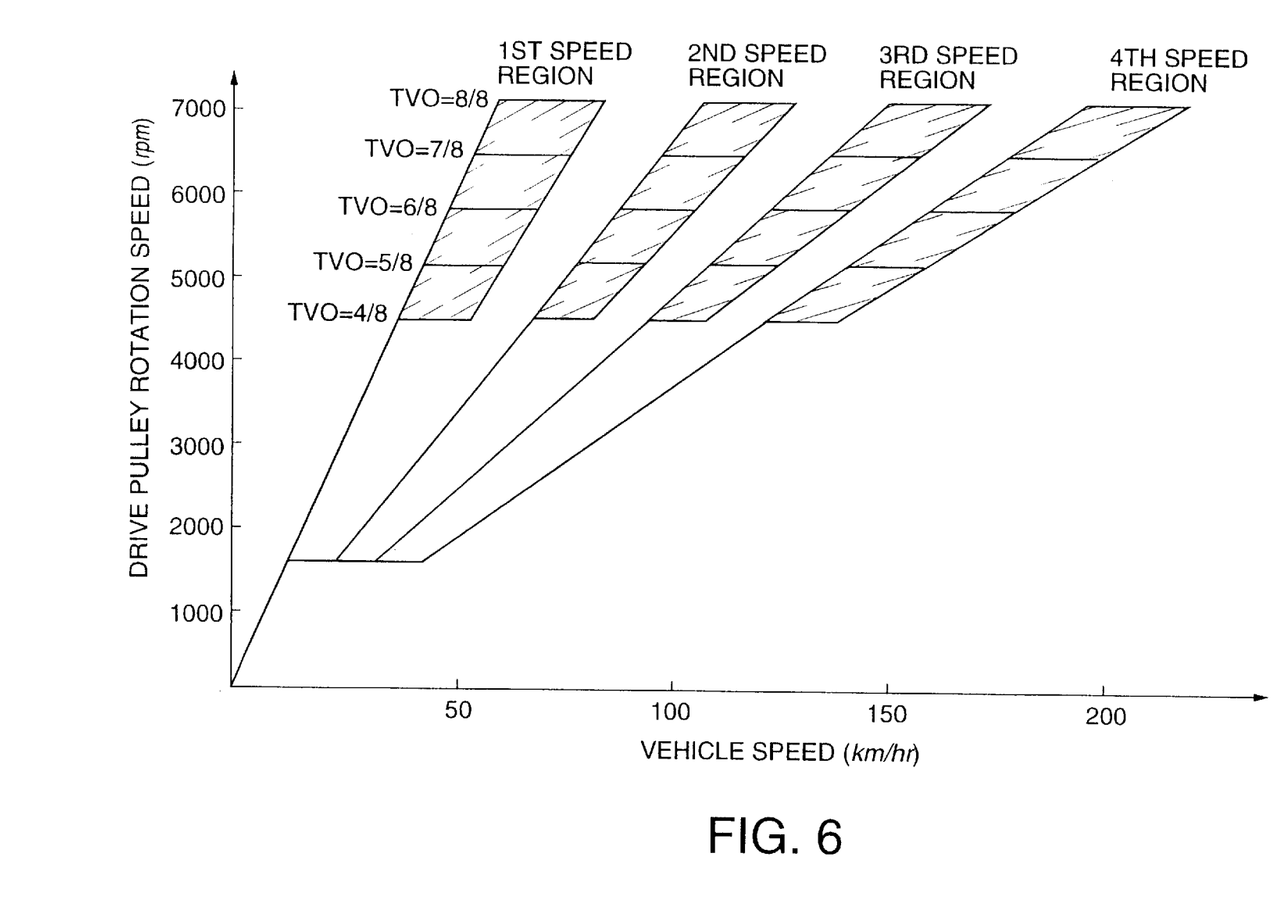
FIG. 6 Is similar to FIG. 3, but showing a second embodiment of this invention.

FIG. 6 shows a second embodiment of this invention.

In this embodiment, the speed change ratio variation in the same speed region is prohibited when the engine load is less than a predetermined value.

The engine load is determined by the throttle opening TVO, and the speed change ratio is varied only when the throttle opening TVO is 4/8 or more. This can easily be implemented by adding TVO≧4/8 to the determining conditions in the STEP 3 of the process of FIG. 4.

In this way, by varying the speed change ratio only in a driving region under relatively high load, the difference of speed change ratio between adjacent speed regions is increased in the low load region where accelerating power is not much required, and a similar response feeling to that of a manual transmission can be achieved.

Figure 7:
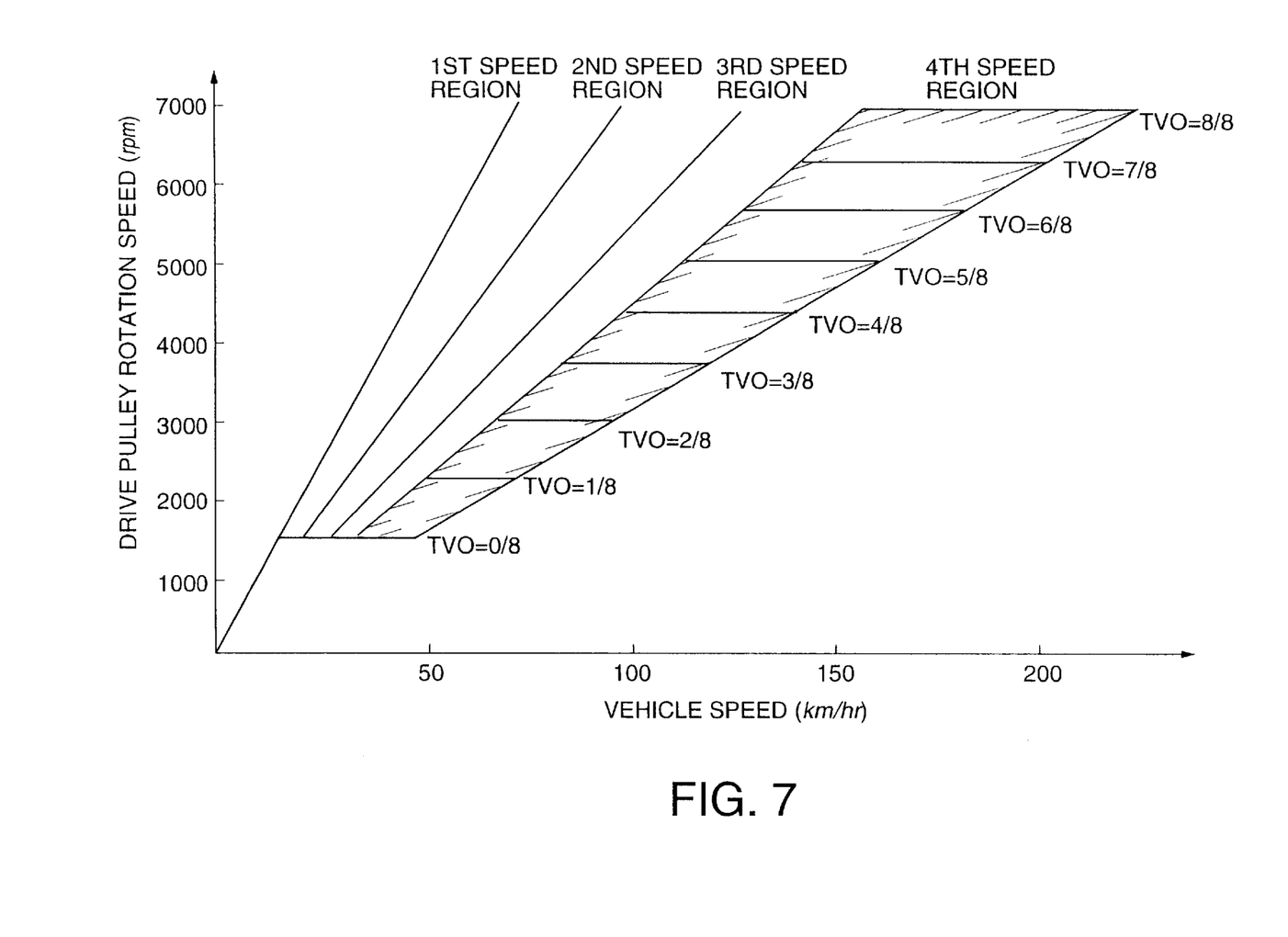
FIG. 7 is similar to FIG. 3, but showing a third embodiment of this invention.

FIG. 7 shows a third embodiment of this invention.

In this embodiment, the target speed change ratio is made to vary only at fourth speed which is top gear.

As the acceleration width at fourth speed is large, the basic speed change ratio at fourth speed can be set larger.

The speed change ratios for the first-third speed regions can also be set larger.

As a result, the difference between the target speed change ratios of the first-third speeds and the difference of target speed change ratios from the third speed to the basic speed change ratio for fourth speed become smaller, and a good acceleration performance can be obtained for the first-third speed regions.

The corresponding structures, materials, acts, and equivalents of all means plus function elements in the claims below are intended to include any structure, material, or acts for performing the functions in combination with other claimed elements as specifically claimed. The embodiments of this invention in which an exclusive property or privilege is claimed are defined as follows:

What is claimed:

1. A speed change controller for controlling a speed change ratio of a continuously variable transmission for a vehicle to a target speed change ratio, said transmission transmitting an engine rotation speed at an arbitrary speed change ratio, said controller comprising:

a selector switch allowing a driver of the vehicle to specify a target speed change ratio from among plural candidate speed change ratios, a sensor detecting a vehicle speed, and a microprocessor programmed to control the speed change ratio of said continuously variable transmission to the target speed change ratio, fix said target speed ratio when a vehicle speed is less than a predetermined value and decrease said target speed change ratio within a predetermined range when the vehicle speed is equal to or greater than the predetermined value.

2. A speed change controller as defined in claim 1, wherein said controller further comprises a sensor for detecting an engine load, and said microprocessor is further programmed to set said predetermined value to be a larger value the larger the engine load.

3. A speed change controller as defined in claim 1, wherein said controller further comprises a sensor for detecting an engine load, and said microprocessor is further programmed to set said predetermined range to be larger the larger the engine load.

4. A speed change controller as defined in claim 1, wherein said controller further comprises a sensor for detecting an engine load, and said microprocessor is further programmed to set said predetermined range in one speed region to be larger than another predetermined range for the same load in another speed region.

5. A speed change controller as defined in claim 1, wherein said microprocessor is further programmed to prevent a decrease of said target speed change ratio when the target speed change ratio specified by the selector switch is different from a predetermined speed change ratio.

6. A speed change controller as defined in claim 1, wherein said microprocessor is further programmed to determine said predetermined range so that the minimum speed change ratio within said predetermined range is situated between said speed change ratio specified by said selector switch and one of said candidate speed change ratios having a nearest value to said speed change ratio specified by said selector switch, while said minimum speed change ratio is larger than said one of said candidate speed change ratios.

7. A speed change controller as defined in claim 1, wherein said selector switch is further functioning to select a decrease characteristic to the decreasing of said target speed change ratio from among plural candidate characteristics, and said microprocessor is further programmed to decrease said target speed change ratio according to said decrease characteristic.

8. A speed change controller as defined in claim 7, wherein said plural candidate characteristics comprise a characteristic for prohibiting decrease of said target speed change ratio.

9. A speed change controller for controlling a speed change ratio of a continuously variable transmission for a vehicle to a target speed change ratio, said transmission transmitting an engine rotation speed at an arbitrary speed change ratio, said controller comprising:

means for allowing a driver of the vehicle to specify a target speed change ratio from among plural candidate speed change ratios, means for detecting a vehicle speed, means for controlling the speed change ratio of said continuously variable transmission to the target speed change ratio, and means for decreasing said target speed change ratio within a predetermined range when a vehicle speed is equal to or greater than a predetermined value and for keeping said target speed change ratio fixed when the vehicle speed is less than said predetermined value.

* * * * *